US010110483B2

(12) United States Patent
Behringer et al.

(10) Patent No.: US 10,110,483 B2
(45) Date of Patent: Oct. 23, 2018

(54) METHOD AND APPARATUS FOR CREATION OF GLOBAL NETWORK OVERLAY WITH GLOBAL PARAMETERS DEFINING AN END-TO-END NETWORK

(71) Applicant: CISCO TECHNOLOGY, INC., San Jose, CA (US)

(72) Inventors: Michael H. Behringer, La Colle-sur-Loup (FR); Patrice Bellagamba, Saint-Raphael (FR)

(73) Assignee: Cisco Technology, Inc., San Jose, CA (US)

(*) Notice: Subject to any disclaimer, the term of this patent is extended or adjusted under 35 U.S.C. 154(b) by 250 days.

(21) Appl. No.: 15/073,931

(22) Filed: Mar. 18, 2016

(65) Prior Publication Data

US 2017/0272359 A1 Sep. 21, 2017

(51) Int. Cl.
G06F 15/173 (2006.01)
H04L 12/715 (2013.01)
H04L 12/46 (2006.01)

(52) U.S. Cl.
CPC .......... H04L 45/64 (2013.01); H04L 12/4641 (2013.01)

(58) Field of Classification Search
CPC ............................ H04L 45/64; H04L 12/4641
USPC ................................. 709/225-226, 245-246
See application file for complete search history.

(56) References Cited

U.S. PATENT DOCUMENTS

| 6,434,627 | B1* | 8/2002 | Millet | H04L 29/12009 709/245 |
| 6,928,478 | B1* | 8/2005 | Gangadharan | H04L 29/12839 709/226 |
| 7,873,711 | B2* | 1/2011 | Adams | G06F 9/5077 709/226 |
| 8,160,056 | B2* | 4/2012 | Van der Merwe | H04L 45/04 370/351 |
| 8,166,205 | B2 | 4/2012 | Farinacci et al. | |
| 8,787,154 | B1* | 7/2014 | Medved | H04L 45/64 370/225 |
| 9,590,902 | B2* | 3/2017 | Lin | H04L 12/4641 |
| 2012/0176934 | A1 | 7/2012 | Farinacci et al. | |
| 2013/0297769 | A1 | 11/2013 | Chang et al. | |
| 2014/0112349 | A1 | 4/2014 | Moreno et al. | |
| 2015/0131669 | A1* | 5/2015 | Biswas | H04L 12/4641 370/395.53 |
| 2015/0163158 | A1* | 6/2015 | Ryland | H04L 45/00 709/225 |

* cited by examiner

*Primary Examiner* — Bharat N Barot
(74) *Attorney, Agent, or Firm* — Cindy Kaplan

(57) ABSTRACT

In one embodiment, a method includes receiving at a virtual controller operating at a network device, global parameters for a plurality of virtual machines located in a first network site and in communication with a second network site through a switch, converting at the virtual controller, the global parameters into global overlay network parameters, and transmitting the global overlay network parameters to the switch for use in automatically creating a global network overlay. The global overlay network parameters define an end-to-end network extending from the virtual machines in the first network site to a plurality of virtual machines in the second network site. An apparatus and logic are also disclosed herein.

20 Claims, 4 Drawing Sheets

METHOD AND APPARATUS FOR CREATION OF GLOBAL NETWORK OVERLAY WITH GLOBAL PARAMETERS DEFINING AN END-TO-END NETWORK

TECHNICAL FIELD

The present disclosure relates generally to communication networks, and more particularly, to network overlays.

BACKGROUND

Networks such as data centers have traditionally been managed individually. For many reasons, including virtual machine mobility and business continuity, there is a need for global synchronization of data centers.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
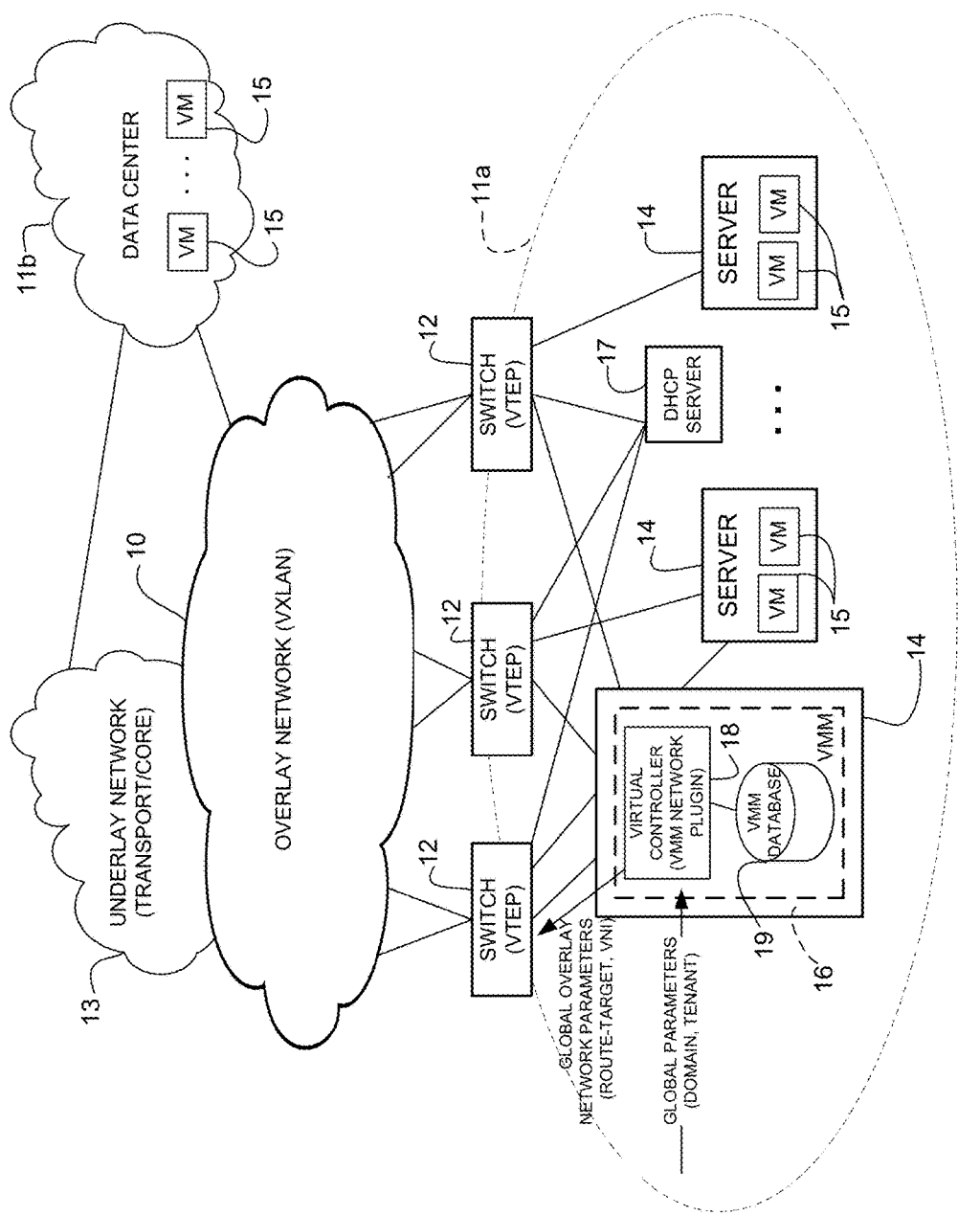
FIG. 1 illustrates an example of a network in which embodiments described herein may be implemented.

In one embodiment, a method generally comprises receiving at a virtual controller operating at a network device, global parameters for a plurality of virtual machines located in a first network site and in communication with a second network site through a switch, converting at the virtual controller, the global parameters into global overlay network parameters, and transmitting the global overlay network parameters to the switch for use in automatically creating a global network overlay. The global overlay network parameters define an end-to-end network extending from the virtual machines in the first network site to a plurality of virtual machines in the second network site.

In another embodiment, an apparatus generally comprises a first interface for receiving global parameters for a plurality of virtual machines located in a first network site, a processor for converting at a virtual controller, the global parameters into global overlay network parameters, a second interface for transmitting the global overlay network parameters to a switch for use in automatically creating a global network overlay, and memory for storing the global parameters. The global overlay network parameters define an end-to-end network extending from the virtual machines in the first network site to a plurality of virtual machines in a second network site.

In yet another embodiment, logic is encoded on one or more non-transitory computer readable media for execution and when executed operable to process at a virtual controller, global parameters received for a plurality of virtual machines located in a first network site, convert the global parameters into global overlay network parameters, and transmit the global overlay network parameters to a switch for use in automatically creating a global network overlay, wherein the global overlay network parameters define an end-to-end network extending from the virtual machines in the first network site to a plurality of virtual machines in a second network site.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Global synchronization of data centers is desired for virtual machine (VM) mobility, business continuity, and many other reasons. In conventional networks, there is no simple way to create a global end-to-end network. Instead, regions are maintained separately and patched together. In one example, manual synchronization may be performed. However, this process is extremely complicated, error prone, and may slow down deployments. Local controllers may be used in synchronization, however, this does not solve the problem of providing an end-to-end network view.

The embodiments described herein allow for automatic configuration of a physical infrastructure from a virtual controller, without the need for a local network controller. As described in detail below global parameters are defined for use in creating an end-to-end (e.g., virtual machine-to-virtual machine) network extending across any number of network sites (e.g., data centers).

Referring now to the drawings, and first to FIG. 1, a simplified network in which embodiments described herein may be implemented is shown. The embodiments operate in the context of a data communication network including multiple network devices. The network may include any number of network devices in communication via any number of nodes (e.g., routers, switches, gateways, controllers, edge devices, access devices, aggregation devices, core nodes, intermediate nodes, or other network devices), which facilitate passage of data within the network. The nodes may communicate over one or more networks (e.g., local area network (LAN), metropolitan area network (MAN), wide area network (WAN), virtual private network (VPN), virtual local area network (VLAN), wireless network, enterprise network, corporate network, Internet, intranet, radio access network, public switched network, or any other network).

The network shown in the example of FIG. 1 includes a VXLAN (Virtual Extensible Local Area Network) overlay 10 defined by a series of network devices (e.g., Virtualization Tunnel End Points—VTEPs) 12 that are connected to a transport network underlay (backbone, core network) 13. VXLAN is an overlay technology used in network virtualization. The overlay network 10 may comprise, for example, a Layer 2 (L2) overlay scheme over a Layer 3 (L3) network and use encapsulation to provide a means to extend Layer 2 segments across a data center network. In one example, VXLAN provides Layer 2 extension over a shared Layer 3 underlay infrastructure network by using MAC address in IP (Internet Protocol) (MAC in IP) tunneling encapsulation.

The transport network 13 may be, for example, an L3 IP network core, L2 metro Ethernet core, MPLS core, or any other type of network.

In one example an IP/BGP (Border Gateway Protocol) underlay 13 is used. For example, Border Gateway Protocol Ethernet Virtual Private Network (BGP EVPN) may be used as the control plane for VXLAN. The BGP EVPN control plane provides protocol-based VTEP peer discovery and end-host reachability information distribution for private and public clouds.

In one embodiment, VXLAN tunnel endpoint (VTEP) devices 12 are used to map tenants' end devices (e.g., virtual machines 15) to VXLAN segments and to perform VXLAN encapsulation and de-encapsulation. Each VTEP function may comprise two interfaces (as shown at switches 12 in FIG. 1): one may be a switch interface on a local LAN segment to support local endpoint communication through bridging; and the other an IP interface to the transport IP network 13.

It is to be understood that VXLAN is one example of an overlay scheme and that other overlay or encapsulation technologies may be used, without departing from the scope of the embodiments.

In the example shown in FIG. 1, the network devices (edge devices, switches) 12 are in communication with a plurality of servers (hosts) 14 comprising a plurality of virtual machines (VMs) 15. The network devices 12 may also communicate with a DHCP (Dynamic Host Configuration Protocol) server 17. Each network device 12 may be in communication with any number of servers 14 comprising any number of virtual machines 15. The network devices 12, servers 14, and virtual machines 15 may be located in a first network site (e.g., data center) 11*a*. The overlay and underlay networks 10, 13 may also be in communication with one or more other data centers or networks (e.g., second network site) 11*b*. The network overlay 10 may interconnect any number of network sites comprising any number of switches 12, servers 14, or virtual machines 15.

The switches 12 are configured to perform encapsulation and decapsulation, and provide the ability to connect L2 networks, L3 networks, or hybrid (L2 and L3) networks together. For data forwarding, the switch 12 may encapsulate user traffic in VXLAN and send it on the IP underlay network 13. In the reverse direction, the switch 12 receives VXLAN encapsulated traffic (packets, frames) from other VTEPs, decapsulates the traffic, and forwards the traffic with native Ethernet encapsulation toward the host. The network devices 12 may be used to encapsulate IP or non-IP Ethernet frames. Each switch 12 may be in communication with any number of hosts (servers 14, virtual machines 15) at each network site 11*a*, 11*b* and may operate in more than one overlay network 10.

The network devices 12 may be switches, routers, or other network devices configured to perform forwarding functions (e.g., L2, L3, or L2/L3 devices). The term "switch" as used herein may refer to any network device (e.g., switch, router, switch/router) operable to perform forwarding functions. The switch 12 may be, for example, a NEXUS series switch available from Cisco Systems, Inc. of San Jose, Calif. It is to be understood that this is only an example of a network device 12 that may be used to implement the embodiments described herein. In one embodiment, an API (Application Programming Interface) is implemented at the switch 12 for communication between the switch and virtual controller 18 (described below).

Figure 4:
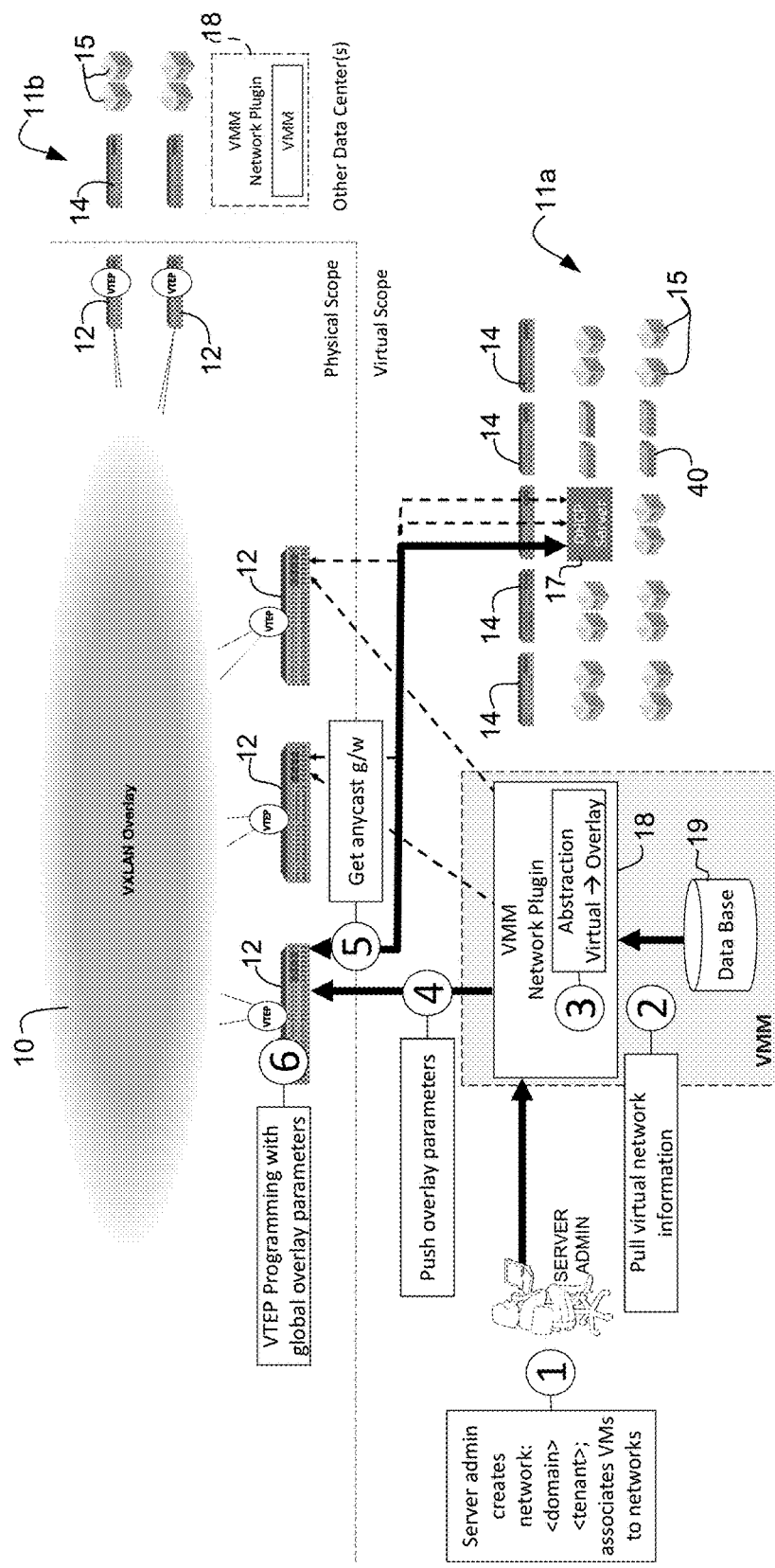
FIG. 4 illustrates automatic creation of the global network overlay in the network shown in FIG. 1, in accordance with one embodiment.

The hosts 14 may be, for example, a blade server, rack server, or any other type of network device and may be configured to host one or more virtual machines (VMs) 15. The virtual machines 15 share hardware resources without interfering with each other, thus enabling multiple operating systems and applications to execute at the same time on a single computer. The virtual machines 15 may be moved (e.g., migration, vMotion, live motion) between servers 14 across Layer 2 or Layer 3 boundaries, based on traffic patterns, hardware resources, or other criteria. As shown in FIG. 4, one or more servers 14 may include a firewall 40.

In one embodiment, a virtual controller 18 operates at one of the network devices (e.g., server) 14. In the example shown in FIG. 1, the virtual controller 18 operates at a Virtual Machine Manager (VMM) 16 and comprises a VMM network plugin. The virtual controller 18 may comprise, for example, a virtual machine installed at one of the network devices 14. The VMM 16 may be associated with a VMM domain comprising one or more virtual controllers 18 and each data center 11*a*, 11*b* may comprise one or more virtual controllers. The virtual controller 18 is used to automatically configure a physical infrastructure without the need for a local network controller or a central super controller. The embodiments also eliminate the need for manual mapping between data centers and core of a global VM-to-VM network.

As described in detail below, the virtual controller 18 receives global parameters from a server administrator, which allows the server administrator to manage the global network and provides for self-creation of the overlay network 10 (i.e., automatic creation of data plane and control plane). The virtual controller 18 may also pull virtual network information stored in a VMI database 19, which may be located at the same network device 14 as the virtual controller 18 or another network device.

In one embodiment, a user interface for the server administrator is handled by the VMM network plugin 18, which is managed by the server administrator, rather than the network administrator. This allows the global network to be controlled by the server administrator. In one example, no cooperation with VMware is needed. An API (e.g., VMtracker) may be provided between the switch 12 and VMM 16.

As described further below with respect to FIG. 4, the embodiments enable a server administrator to manage a global network without the need to communicate with network administrators. This allows for automated network setup so that the server administrator can control the network. In one embodiment, the server administrator may enter on each virtual controller 18 global parameters (e.g., tenant identifier and domain identifier) in order to associate the virtual machine with a network. The parameters <domain> and <tenant> are referred to herein as global parameters since they are global between network sites (e.g., data centers 11*a* and 11*b* in FIG. 1). The global parameters may also be referred to as global server parameters since they are associated with the virtual machines operating at the servers and defined by the server administrator rather than a network administrator. The server administrator ensures that the same parameters are used in all network sites. These parameters allow for control of the global network by the server administrator. The virtual controller 18 also has access to VM network parameters (e.g., port and VLAN), which may be stored in the VMM database 19. The virtual controller 18 uses this information to convert deterministically the global parameters (tenant, domain) into global overlay network parameters (route-target, VNI (Virtual Network Interface)). The route-target and VNI are referred to herein as global overlay network parameters since they are used to automatically create a data plane and control plane for the global network overlay 10. For example, the global overlay network parameters may be used for VTEP programming at the switches 12 to automatically create the global network overlay, as described below with respect to FIG. 4.

It is to be understood that the network devices and topology shown in FIG. 1 and described above is only an example and the embodiments described herein may be implemented in networks comprising different network topologies or network devices, or using different protocols, without departing from the scope of the embodiments. For example, the network may include any number or type of network devices that facilitate passage of data over the network (e.g., routers, switches, gateways, controllers, appliances), network elements that operate as endpoints or hosts (e.g., servers, virtual machines, clients), and any number of network sites or domains in communication with any number of networks. Thus, network nodes may be used in any suitable network topology, which may include any number of servers, virtual machines, switches, routers, appliances, controllers, or other nodes interconnected to form a large and complex network, which may include cloud or fog computing. Nodes may be coupled to other nodes or networks through one or more interfaces employing any suitable wired or wireless connection, which provides a viable pathway for electronic communications.

Figure 2:
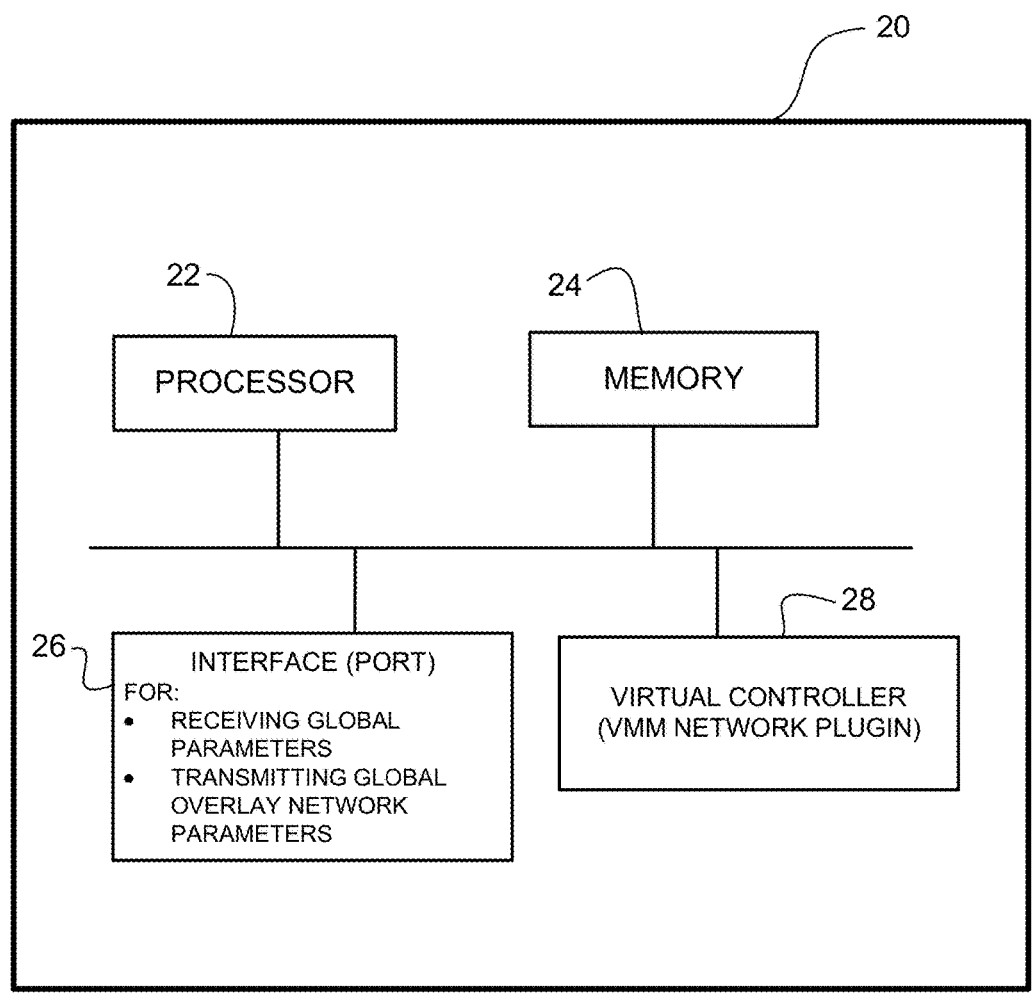
FIG. 2 depicts an example of a network device useful in implementing embodiments described herein.

FIG. 2 illustrates an example of a network device 20 (e.g., network device 14 hosting virtual controller 18 in FIG. 1) that may be used to implement the embodiments described herein. In one embodiment, the network device 20 is a programmable machine that may be implemented in hardware, software, or any combination thereof. The network device 20 includes one or more processor 22, memory 24, network interface 26, and virtual controller 28 (e.g., VMM network plugin).

Memory 24 may be a volatile memory or non-volatile storage, which stores various applications, operating systems, modules, and data for execution and use by the processor 22. One or more components of the virtual controller 28 (e.g., code, logic, software, etc.) may be stored in memory 24. Memory 24 may also store global network parameters or virtual network information stored in database 19 in FIG. 1. The network device 20 may include any number of memory components.

Logic may be encoded in one or more tangible media for execution by the processor 22. The processor 22 may be configured to implement one or more of the functions described herein. For example, the processor 22 may execute codes stored in a computer-readable medium such as memory 24 to perform the process described below with respect to FIG. 3. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The network device 20 may include any number of processors 22.

The network interface 26 may comprise any number of interfaces (linecards, ports) for receiving data or transmitting data to other devices. As shown in FIG. 1, a first interface may be used to receive global network parameters from a server administrator and a second interface used to transmit global overlay network parameters derived from the global parameters. The network interface 26 may include, for example, an Ethernet interface for connection to a computer or network. The network interface 26 may be configured to transmit or receive data using a variety of different communication protocols. The interface 26 may include mechanical, electrical, and signaling circuitry for communicating data over physical links coupled to the network.

It is to be understood that the network device 20 shown in FIG. 2 and described above is only an example and that different configurations of network devices may be used. For example, the network device 20 may further include any suitable combination of hardware, software, algorithms, processors, devices, components, modules, or elements operable to facilitate the capabilities described herein.

Figure 3:
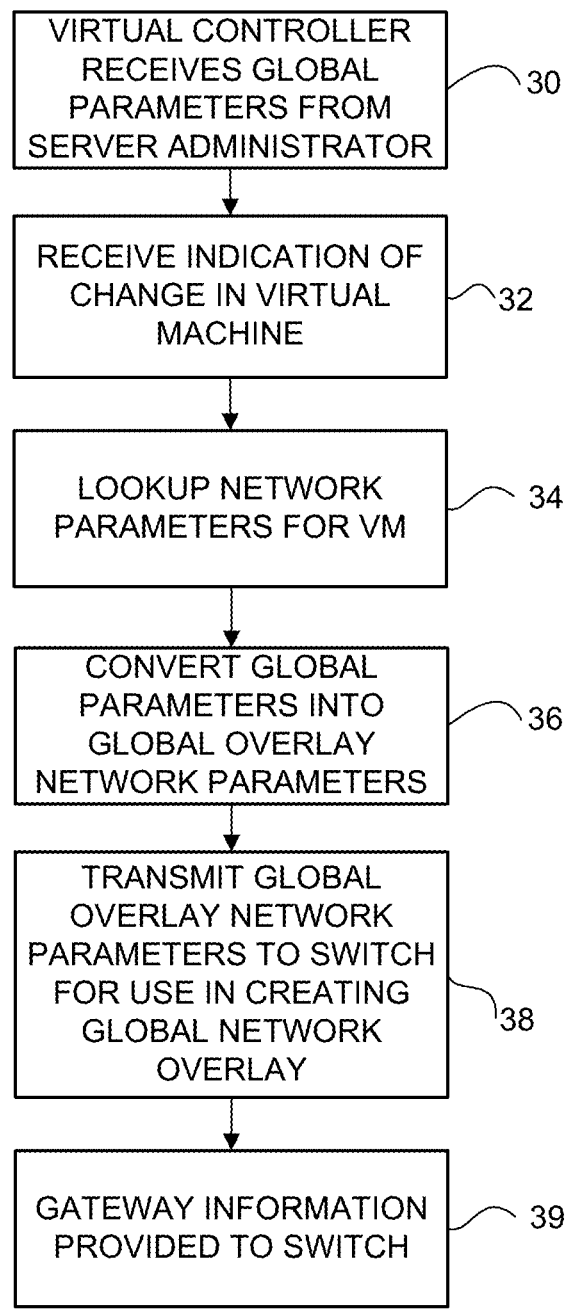
FIG. 3 is a flowchart illustrating an overview of a process for automatic creation of a global network overlay, in accordance with one embodiment.

FIG. 3 is a flowchart illustrating an overview of a process for automatic creation of a global network overlay, in accordance with one embodiment. At step 30, the virtual controller 18 (e.g., VMM network plugin) receives and stores global parameters received from a server administrator (FIGS. 1 and 3). The global parameters may comprise a tenant identifier and a domain identifier for the VM 15. When the virtual controller 18 identifies a change in status of the virtual machine 15 (e.g., migration of VM, new VM comes online, VM reboot) (step 32), the virtual controller performs a lookup for network parameters for the VM (step 34). The network parameters may include, for example, the global parameters received at step 30 along with port and VLAN information. The virtual controller 18 converts the global parameters (e.g., tenant, domain) into global overlay network parameters (e.g., route-target, VNI) (step 36). The global overlay network parameters are pushed to the appropriate network device (e.g., switch 12 in communication with the server 14 on which the VM is installed) for use in creating the global network overlay (step 38). Gateway information may also be provided to the network device as described below (step 39).

It is to be understood that the process shown in FIG. 3 and described above is only an example and that steps may be added, combined, removed, or modified without departing from the scope of the embodiments.

FIG. 4 illustrates automatic creation of the global network overlay 10 in the network of FIG. 1, in accordance with one embodiment. As previously described, the embodiments provide globalization of the network by defining end-to-end network identifiers. In one example, these global parameters may include an L3VPN-ID (Layer 3 Virtual Private Network Identifier)/<tenant> and an L2VPN-ID (Layer 2 Virtual Private Network Identifier)/<domain>. As described below, these parameters allow for self-creation (automatic creation) of the global network overlay.

On each virtual controller 18, the server administrator may enter for each VM 15 the global <tenant> and <domain> to which it belongs. As shown at (1) on FIG. 4, the server administrator creates global parameters (e.g., <domain> and <tenant>) for the network and associates each VM to a tenant and domain. As previously described with respect to FIG. 1, the domain and tenant identifiers are global across all data centers (network sites) 11a, 11b. The server administrator may ensure that in all network sites the same parameters are used. This allows automatic network setup so that the server administrator can control the global network. The virtual controller 18 may store this information in the VMM database 19.

As shown at (2), the virtual controller 18 pulls virtual network information from the VMM database 19. This action may be triggered, for example, by a reboot or live motion of the virtual machine 15. The virtual controller 18 finds for the VM 15, its network parameters, including, for example, port, VLAN and the global parameters (domain, tenant) received from the server administrator. These parameters provide an abstraction from local virtual to global overlay.

The virtual controller 18 may then convert deterministically <tenant> and <domain> (global parameters) into a <route-target> and <VNI>, respectively (global overlay network parameters) (3).

The global overlay network parameters are pushed from the virtual controller 18 to the switch 12 (4). As discussed above, the switch 12 may use an API to get network parameters (e.g., <VM>, <port>, <VLAN>, <VNI>, <route-target>) from the virtual controller 18. It should be noted that the switches 12 have previously registered with the VMM.

In order to complete the network set-up, the switches 12 may need to know anycast gateway information (e.g., default gateway, subnet, subnet mask). In one example, if DHCP is available, the switch 12 poses as a client and pulls the information from the DHCP server 17 (5). This is to get complimentary information that the plugin does not have. The object is to set the anycast gateway parameters. For each VLAN configured on the switch 12, the switch may extract default gateway, subnet, and subnet mask through DHCP, acting as a simple DHCP client. If DHCP is not available, the information may be entered manually and pushed by the virtual controller 18.

The switch 12 may then automatically create the data plane and control plane for the overlay network 10 through VTEP programming with global overlay network parameters (6). For example, the switch 12 may configure a mapping between VLAN (Virtual Local Area Network) and VNI (Virtual Network Interface). The switch 12 may create: an NVE (Network Virtualization Edge) interface; VLAN on <port>, VRF (Virtual Routing and Forwarding) using the route-target learned from the VMM network plugin 18; and a VLAN interface (SVI (Switch Virtual Interface)) with <default gateway>, <subnet>, <subnet mask>, and <vrf>, and mark it as an anycast gateway. The switch 12 may also automatically create the control plane by creating an EVPN (Ethernet Virtual Private Network) address family with the <route-target> as extended community.

As can be observed from the foregoing, the embodiments described herein allow for the automatic creation of a global network overlay by configuring a physical infrastructure from a virtual controller, without the need for a local network controller or a central super controller. The embodiments eliminate the need to manually map a global end-to-end network between data centers and a core network.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   receiving at a virtual controller operating at a network device, global parameters for a plurality of virtual machines located in a first network site and in communication with a second network site through a switch;
   converting at the virtual controller, said global parameters into global overlay network parameters; and
   transmitting said global overlay network parameters to the switch for use in automatically creating a global network overlay;
   wherein said global overlay network parameters define an end-to-end network extending from said plurality of virtual machines in said first network site to a plurality of virtual machines in said second network site; and
   wherein said global parameters comprise a tenant and domain for each of said plurality of virtual machines and converting said global parameters into said global overlay network parameters comprises converting the tenant into a route-target and the domain into a virtual network interface.

2. The method of claim 1 wherein the virtual controller comprises a virtual machine manager network plugin.

3. The method of claim 1 further comprising pulling said global parameters and virtual network information comprising a virtual local area network and a virtual network interface associated with one of the virtual machines from a database upon identifying a change in the virtual machine at the network device.

4. The method of claim 1 wherein anycast gateway information is provided to the switch by a DHCP (Dynamic Host Configuration Protocol) server for use in setting anycast gateway parameters.

5. The method of claim 1 wherein automatically creating said global network overlay comprises automatically creating a data plane and a control plane for said global network overlay.

6. The method of claim 1 wherein said global network overlay comprises a Virtual Extensible Local Area Network (VXLAN).

7. The method of claim 1 wherein said global parameters are received from a server administrator.

8. An apparatus comprising:
   a first interface for receiving global parameters for a plurality of virtual machines located in a first network site;
   a processor for converting at a virtual controller, said global parameters into global overlay network parameters;
   a second interface for transmitting said global overlay network parameters to a switch for use in automatically creating a global network overlay; and
   memory for storing said global parameters;
   wherein said global overlay network parameters define an end-to-end network extending from said plurality of virtual machines in said first network site to a plurality of virtual machines in a second network site; and
   wherein said global parameters comprise a tenant and domain for each of said plurality of virtual machines and converting said global parameters into said global overlay network parameters comprises converting the tenant into a route-target and the domain into a virtual network interface.

9. The apparatus of claim 8 wherein the virtual controller comprises a virtual machine manager network plugin.

10. The apparatus of claim 8 wherein the processor is further configured for pulling said global parameters and virtual network information comprising a virtual local area network and a virtual network interface associated with one of the virtual machines from said memory upon identifying a change in the virtual machine.

11. The apparatus of claim 8 wherein said global parameters are defined by a server administrator.

12. The apparatus of claim 8 wherein automatically creating said global network overlay comprises automatically creating a data plane and a control plane for said global network overlay.

13. The apparatus of claim 8 wherein anycast gateway information is provided to the switch by a DHCP (Dynamic Host Configuration Protocol) server for use in setting anycast gateway parameters.

14. The apparatus of claim 8 wherein said global network overlay comprises a Virtual Extensible Local Area Network (VXLAN).

15. One or more non-transitory computer readable media encoding logic for execution by a processor and when executed operable to:
   process at a virtual controller, global parameters received for a plurality of virtual machines located in a first network site;
   convert said global parameters into global overlay network parameters; and
   transmit said global overlay network parameters to a switch for use in automatically creating a global network overlay;
   wherein said global overlay network parameters define an end-to-end network extending from said plurality of virtual machines in said first network site to a plurality of virtual machines in a second network site; and
   wherein said global parameters comprise a tenant and domain for each of said plurality of virtual machines and converting said global parameters into said global overlay network parameters comprises converting the tenant into a route-target and the domain into a virtual network interface.

16. The non-transitory computer readable media of claim 15 further operable to pull said global parameters and virtual network information comprising a virtual local area network and a virtual network interface associated with one of the virtual machines from a database upon identifying a change in the virtual machine.

17. The non-transitory computer readable media of claim 15 wherein anycast gateway information is provided to the switch by a DHCP (Dynamic Host Configuration Protocol) server for use in setting anycast gateway parameters.

18. The non-transitory computer readable media of claim 15 wherein automatically creating said global network overlay comprises automatically creating a data plane and a control plane for said global network overlay.

19. The non-transitory computer readable media of claim 15 wherein said global network overlay comprises a Virtual Extensible Local Area Network (VXLAN).

20. The non-transitory computer readable media of claim 15 wherein said global parameters are received from a server administrator.

* * * * *